(12) United States Patent
Zhang et al.

(10) Patent No.: US 11,979,814 B2
(45) Date of Patent: *May 7, 2024

(54) METHOD FOR UPDATING A NUMBER OF HOPS THAT IS TO BE USED FOR COMMUNICATION BETWEEN A PUBLISHER MESH NODE AND A SUBSCRIBER MESH NODE IN A WIRELESS MESH NETWORK

(71) Applicant: Telefonaktiebolaget LM Ericsson (publ), Stockholm (SE)

(72) Inventors: Jingcheng Zhang, Svartinge (SE); Per Elmdahl, Linkoping (SE); Wei Shen, Linkoping (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,387

(22) Filed: Apr. 28, 2022

(65) Prior Publication Data

US 2022/0264424 A1 Aug. 18, 2022

Related U.S. Application Data

(63) Continuation of application No. 16/959,420, filed as application No. PCT/EP2018/052986 on Feb. 7, 2018, now Pat. No. 11,350,340.

(51) Int. Cl.
*H04W 40/24* (2009.01)
*H04W 84/18* (2009.01)

(52) U.S. Cl.
CPC ......... *H04W 40/248* (2013.01); *H04W 84/18* (2013.01)

(58) Field of Classification Search
CPC .................................................. H04W 84/18
See application file for complete search history.

(56) References Cited

U.S. PATENT DOCUMENTS

| 7,626,966 B1 | 12/2009 | Ruiter et al. |
| 2005/0249215 A1 | 11/2005 | Kelsey et al. |

(Continued)

FOREIGN PATENT DOCUMENTS

| EP | 3128790 A1 | 2/2017 |
| EP | 3132647 A1 | 2/2017 |
| WO | 2015158562 A1 | 10/2015 |

OTHER PUBLICATIONS

PCT International Search Report, dated Nov. 6, 2018, in connection with International Application No. PCT/EP2018/052986, all pages.

(Continued)

*Primary Examiner* — Shukri Taha
(74) *Attorney, Agent, or Firm* — Leffler Intellectual Property Law, PLLC

(57) ABSTRACT

A method of enabling a publisher mesh node to update a number of hops that is to be used for communication between said publisher mesh node and a subscriber mesh node in a wireless mesh network, wherein said method comprises the steps of periodically receiving, by said subscriber mesh node, broadcasted messages from said publisher mesh node, wherein said broadcasted messages comprise a number of hops that said broadcasted messages may traverse in said mesh network, determining, by said subscriber mesh node, that one or more periodically broadcasted messages have not been received, transmitting, by said subscriber mesh node in reply to said determination that one or more periodically broadcasted messages have not been received, a probe message to said publisher mesh node, wherein said probe message comprises a number of hops (Continued)

corresponding to a periodically broadcasted message that was received by said subscriber mesh node.

10 Claims, 4 Drawing Sheets

(56) References Cited

U.S. PATENT DOCUMENTS

| | | |
|---|---|---|
| 2010/0061272 A1* | 3/2010 | Veillette .............. H04W 40/005 370/254 |
| 2012/0039235 A1 | 2/2012 | Chen et al. |
| 2013/0279410 A1 | 10/2013 | Dublin, III et al. |
| 2013/0315078 A1 | 11/2013 | Brown et al. |
| 2017/0034760 A1 | 2/2017 | Ge |
| 2020/0228932 A1 | 7/2020 | Ernst et al. |

OTHER PUBLICATIONS

PCT Written Opinion, dated Nov. 6, 2018, in connection with International Application No. PCT/EP2018/052986, all pages.
Unknown, "Mesh Networking Specifications", Bluetooth, captured Jun. 30, 2020, https://patentscope.wipo.int/search/en/detail.jsf?docId=WO2019154481, 3 pages.

* cited by examiner

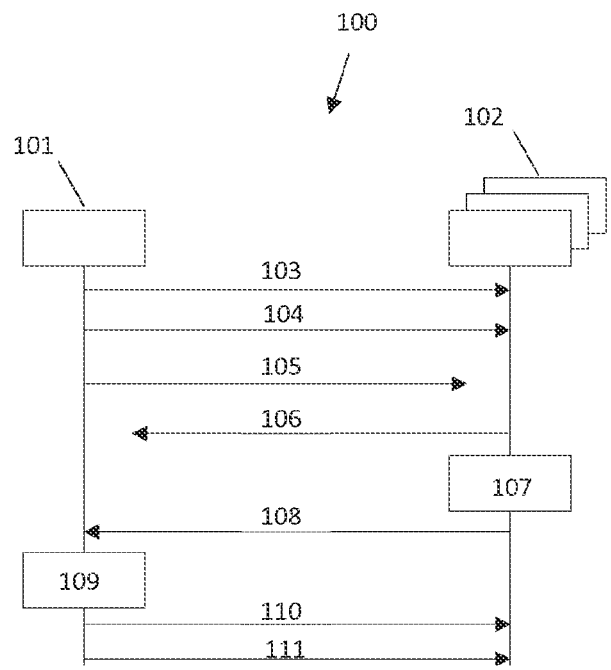
Fig. 3
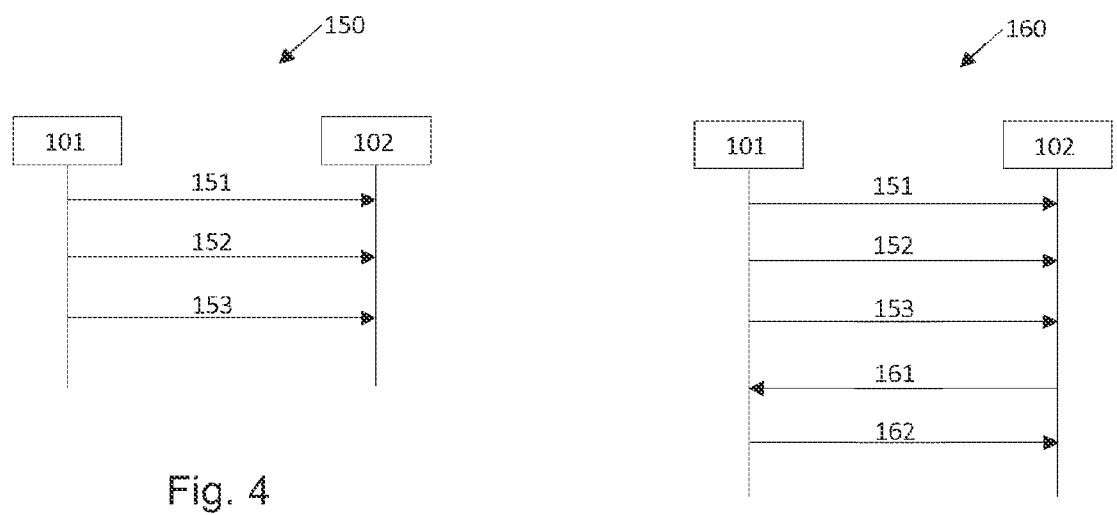
Fig. 4
Fig. 5

METHOD FOR UPDATING A NUMBER OF HOPS THAT IS TO BE USED FOR COMMUNICATION BETWEEN A PUBLISHER MESH NODE AND A SUBSCRIBER MESH NODE IN A WIRELESS MESH NETWORK

CROSS-REFERENCE TO RELATED APPLICATIONS

This application claims the benefit of U.S. application Ser. No. 16/959,420, filed Jun. 30, 2020 (371(c) date), which is a 371 National Stage Application of PCT/EP2018/052986, filed Feb. 7, 2018. Both of these earlier applications are hereby incorporated herein by reference in their entireties.

TECHNICAL FIELD

The present invention is generally related to wireless mesh networks, more specifically to the updating of the number of hops to be used for communication between a publisher mesh node and a subscriber mesh node in a wireless mesh network.

BACKGROUND

A wireless mesh network, WMN, comprises a plurality of mesh nodes organized in a mesh topology. Here, each mesh node is also some sort of provider by forwarding data to the next mesh node. The network infrastructure is decentralized because each mesh node only needs to be able to transmit to a neighbouring mesh node. Such wireless mesh networks could allow people living in remote areas and small businesses operating in rural neighbourhoods to connect their networks together for affordable internet connections.

Wireless mesh network can be implemented with various wireless technologies including 802.11, 802.15, cellular technologies and Bluetooth. Bluetooth mesh networking is standardized by the Bluetooth Special Interest Group, SIG, and the first release of Bluetooth Mesh was released in July 2017. The solution is based on flooding using broadcasting over a set of shared channels referred to as the advertisement channels.

A node acting as a relay in a Bluetooth mesh network scans the advertisement channels for mesh messages. When a Mesh message is detected and received, the node checks to see if it is the destination of the message. If the node is not the destination of the node, the node checks if it has already received and forwarded the message. If yes, the message is discarded. If not, the message is forwarded in the mesh network by re-transmitting it over the advertisement channels so that the neighbours of the node can receive it. Typically some random delay is introduced before forwarding the message to avoid collisions. By means of this distributed mechanism, the message is forwarded from node to node in the network so that the message arrives at the destination.

In a flooding network like Bluetooth Low Energy mesh, all relay nodes may forward a received mesh message if it is valid and is received for the first time. Eventually, all relays will receive every message transmitted within the same network. Hence, this method is considered to consumes a lot of unnecessary bandwidth. In order to limit this, a Time to Live (TTL) value is included in every mesh package to limit number of hops that a message can be relayed in the network. The value of TTL is reduced by 1 when it is relayed. A message with TTL equals to 1 shall not be relayed. If a message is not supposed to be relayed, the message can also be generated with TTL value set to 0. The maximum TTL value is 127 and the maximum number of hops is 126. In a large and dense network, it is crucial to choose a proper TTL value when a sender transmits a message.

A publish-subscribe paradigm is specified for exchanging application data in a BLE mesh network. The message sender, I.e., message publisher, sends the message to the destination address called a publish address. Meanwhile, one or more receivers, i.e. subscribers, subscribe the publish address to receive the message. When a publisher sends a multicast message, the TTL value of the message is determined based on the distance, i.e. number of hops, towards a subscriber that requires most number of hops.

For example, publisher A may send a multicast message to group address GA which is subscribed by node B, node C and node D. According to the topology, node B is one hop away from node A. Node A needs at least two hops to reach node C and at least three hops to reach node D. As a result, in order to reach all nodes that subscribe to GA, the publisher needs to send the mesh message with minimum TTL value equal to three. In practice, the TTL is always set a little bit higher than the minimum value.

In order for the publisher to figure out a proper TTL value when sending unicast or multicast messages to the destination(s), the Mesh specification specifies the so-called Heartbeat Procedure and the corresponding states in the foundation model. A Configuration Client, for example a Smart Phone which acts as a Provisioner, running a configuration client model configures a Configuration Server, typically a mesh node, running a configuration server model with Heartbeat states using Heartbeat Publication messages.

The heartbeat message is sent from the publisher to the group address that all subscribers are listening to. In the transport PDU part of the mesh message, the heartbeat message carries the initial TTL value set by the publisher. Once the subscriber receives the heartbeat message, it can calculate the actual TTL utilized to traverse between the publisher and itself by subtracting the initial TTL with the remaining TTL received in the message network layer.

For example, node A is the publisher, and node B is one of the subscribers. The mesh specification defines the heartbeat publish state and the heartbeat subscribe state which are used to control the heartbeat operation and retrieve heartbeat TTL measurement result. These states are defined in the foundation model which could only be accessed by using a device key of each node. In this case, the configuration client, which in most of the case the provisioner will do the corresponding configuration of each node. Firstly, the configuration client configures each subscriber to receive the upcoming heartbeat message from the specific publisher. Secondly, the configuration client configures the publisher to start sending heartbeat messages. Meanwhile, the configuration client can optionally start a timer to keep track of the heartbeat TTL measurement process time. During this period, the publisher sends heartbeat messages periodically to the preconfigured group address. Once the heartbeat message is received by the subscriber node, the measured TTL is recorded in the local node. When this procedure is finished, the configuration client contacts each subscriber to collect the test results. By summarizing the received test results, the configuration client can configure the publisher to use a reasonable TTL value to publish message to the group address so that all the subscribers have a good chance to receive the message.

One of the drawbacks of the above is that the configuration client is always required during the TTL discovery phase. In order to access the heartbeat, publish state and heartbeat subscription state, the device keys for each device is needed which are usually stored by the provisioner. Also, due to the usage of the device, the TTL discovery result has to be collected subscriber by subscriber via unicast. Furthermore, the specification also enforces the node behaviour so that concurrent TTL discovery procedures are not allowed for a single node. Since this procedure needs to be measured for each publisher, it might take very long time to optimize the TTL for a big network.

The dependency of the configuration client on TTL configuration increases the chance of single point of failure. In some cases, the provisioner only present during the network deployment/provisioning phase. This make it impossible to reuse the current TTL discovery procedure to update the TTL during the network operation time.

Another drawback is that like many other radio systems, the radio environment in a BLE mesh network is not always stable. The TTL value that was initially configured during the TTL discovery procedure might not always work or optimized along the time. In some cases, a temporally breaks down of critical relay might cause the configured TTL not big enough to reach all subscribers. On the other hand, if the network is redeployed, e.g., by adding more relays, the initial configured TTL might be too big for the current network topology, simply because there is a new path available due to the newly added relays. Although the communication still works, it generates a lot of unnecessary message transmissions since the TTL configured is too high than needed.

SUMMARY

It is an object of the present disclosure to provide for methods for updating the number of hops that is to be used for communication between a subscriber mesh node and a publisher mesh node in a wireless mesh network.

It is another object of the present disclosure to provide for mesh nodes arranged for updating the number of hops to be used for communication between a subscriber mesh node and a publisher mesh node in a wireless mesh network.

In a first aspect, there is provided a method for enabling a publisher mesh node to update a number of hops that is to be used for communication between said publisher mesh node and a subscriber mesh node in a wireless mesh network.

The method comprises the steps of:
periodically receiving, by said subscriber mesh node, broadcasted messages from said publisher mesh node, wherein said broadcasted messages comprise a number of hops that said broadcasted messages may traverse in said mesh network;
determining, by said subscriber mesh node, that one or more periodically broadcasted messages have not been received;
transmitting, by said subscriber mesh node, in reply to said determination that one or more periodically broadcasted messages have not been received, a probe message to said publisher mesh node, wherein said probe message comprises a number of hops corresponding to a periodically broadcasted message that was received by said subscriber mesh node.

One of the advantageous of the present disclosure is that it is an ad-hoc kind of way for updating the number of hops required for communication between the publisher mesh node and the subscriber mesh node. There is no need for a configuration client or provisioner to be present. The invention is based on the concept that the subscriber node expects periodic messages from the publisher node, and, if one or more of such messages are not received, it notifies the publisher mesh node accordingly. The mesh node may then update the number of hops for communication between the subscriber node and the publisher node. For example, the publisher mesh node may increase the number of hops required by 1, by 2 or by anything alike, and may try again.

Another advantage is that the method in accordance with the present disclosure is compatible with mesh specifications currently available.

The concept of the present disclosure is that the publisher mesh node periodically broadcasts messages into the mesh network. Subscriber mesh nodes that subscribe to that particular publisher node may expect to receive these kind of broadcasted messages. The subscriber mesh node may notify the publisher mesh node whenever such a broadcasted message is not received. The subscriber mesh node may thus direct a unicast message towards the publisher mesh node, wherein the unicast message, i.e. the probe message, comprises the number of hops last known for the subscriber mesh node. For example, the subscriber mesh node may have received a message from the publisher mesh node, wherein that particular mesh node comprises a specific number of hops that it has travelled before reaching the subscriber mesh node. That particular number of hops may then be used, by the subscriber mesh node, in the probe message that is sent back to the publisher node again.

In accordance with the present disclosure, the number of hops may be considered as the time to live, TTL. Each time a particular message is received and retransmitted, the TTL may be decremented which limits the number of hops in the wireless mesh network, thereby eliminating endless loops.

Bluetooth Mesh is typically a flood network. It may be based on the mesh nodes relaying the received messages. Every relay mesh node that receives a network message that has a TTL≥2 may be retransmitted with TTL=TTL−1. TTL thus may be prevent flooding.

In an example, the method further comprises the step of:
receiving, by said subscriber mesh node, a status message, wherein said status message comprises an updated number of hops that is to be used for communication between said publisher mesh node and said subscriber mesh node.

The status message which is sent by the publisher node to the subscriber node, i.e. a unicast message destined for the subscriber node, may comprise the updated number of hops that is to be used for communication between the publisher mesh node and the subscriber mesh node.

In a further embodiment, the method further comprises the steps of:
determining, by said subscriber mesh node, that an expected status message is not received from said publisher mesh node within a predefined period of time;
transmitting, by said subscriber mesh node, an updated probe message to said publisher mesh node, wherein said updated probe message comprises an increased number of hops.

The above entails that the subscriber mesh node may keep on transmitting probe messages until the subscriber mesh node receives a status message with a particular TTL, i.e. a number of hops. That is, the publisher mesh node may increase the TTL and sent out a status message to the subscriber mesh node. The status message may not be received by the subscriber mesh node. This would cause the subscriber mesh node to sent another probe message to the publisher mesh node with an increased TTL, to thereby invoke the publisher mesh node to increase its TTL for the status messages that it is broadcasting. Such a process may repeat itself until the subscriber mesh node has received a status message from the publisher mesh node.

In a further embodiment, the step of transmitting comprises the step of determining said number of hops corresponding to said periodically broadcasted message by any of the steps of:

receiving, by said subscriber mesh node, from a provisioner mesh node said number of hops that was set for said subscriber mesh node during a discovery phase in said mesh network;

using, by said subscriber mesh node, said number of hops in a broadcasted message that was last received from said publisher mesh node.

The subscriber mesh node may use a particular message that had been previously received from the publisher mesh node as a reference point for indicating the number of hops. That is, the previous received message may comprise the number of hops that was actually used at that time by the published mesh node. That amount may be used as a reference point for the publisher mesh node.

Another option is that the subscriber mesh node requests a provisioner mesh node, i.e. a supervisor, for the number of hops that was set for the subscriber mesh node, or for the group to which the subscriber mesh node belongs, during a discovery phase in the mesh network.

In a further example, the step of determining, by said subscriber mesh node, that one or more periodically broadcasted messages have not been received comprises any of:

determining, by said subscriber node, that a broadcasted message has not been received in case a predefined amount of time has lapsed since a particular broadcasted message that was received;

determining, by said subscriber node, that an amount of not received broadcasted messages is above a predefined threshold.

It Is noted that the subscriber mesh node does not need to inform the publisher mesh node immediately in case a particular periodic message has not been received. The inventors have found that the presented method may have improved functionality in case the amount of missed broadcasted message is above a predefined threshold within a particular time span. This would counterfeit so called false positives.

In a second aspect, there is provided a method for updating a number of hops that is to be used for communication between a publisher mesh node and a subscriber mesh node in a wireless mesh network, wherein said method comprises the steps of:

periodically broadcasting, by said publisher mesh node, messages, wherein said messages comprise a number of hops that said broadcasted message may traverse in said mesh network;

receiving, by said publisher mesh node, a probe message from said subscriber mesh node, thereby indicating that one or more periodically broadcasted messages have not been received, wherein said probe message comprises a number of hops corresponding to a periodically broadcasted message that was received by said subscriber mesh node;

updating, by said publisher mesh node, said number of hops that said broadcasted message may traverse in said mesh network.

The advantages of the first aspect of the disclosure being a method of forwarding a message in mesh network are also inherently a part of the second aspect of the disclosure. Furthermore, it is pointed out that although the claims read as if all the equipment according to the present disclosure are incorporated into a single node, a person skilled in the art understands that the same disclosure could be implemented by, distributing the equipment over several nodes. As an example, nodes in wireless mesh network often have very low processing power and therefore, the process equipment may be located centrally in a node which has a higher processing power. Such a solution, although not preferable, may also require additional signalling between said central node and the node forwarding the message.

In an example, the method further comprises the step of transmitting, by said publisher mesh node, to said subscriber mesh node, a status message wherein said status message comprises an updated number of hops that is to be used for communication between said publisher mesh node and said subscriber mesh node.

In another example, the step of updating comprises any of:

maintaining, by said publisher mesh node, said number of hops used in said broadcasted messages in case said number of hops in said probe message is less then said number of hops used in said broadcasted messages;

adopting, by said publisher mesh node, said number of hops in said probe message in case said number of hops in said probe message is more then said number of hops used in said broadcasted messages.

In a third aspect of the disclosure, there is provided a subscriber mesh node arranged for enabling a publishes mesh node to update a number of hops that is to be used for communication between said publisher mesh node and said subscriber mesh node in a wireless mesh network, wherein said subscriber mesh node comprises:

receive equipment arranged for periodically receiving broadcasted messages from said publisher mesh node, wherein said broadcasted messages comprise a number of hops that said broadcasted messages may traverse in said mesh network;

process equipment arranged for determining that one or more periodically broadcasted messages have not been received;

transmit equipment arranged for transmitting, in reply to said determination that one or more periodically broadcasted messages have not been received, a probe message to said publisher mesh node, wherein said probe message comprises a number of hops corresponding to a periodically broadcasted message that was received by said subscriber mesh node.

In an example, the receive equipment is further arranged for:

receiving, a status message, wherein said status message comprises an updated number of hops that is to be used for communication between said publisher mesh node and said subscriber mesh node.

In a further example, the process equipment is further arranged for:

determining that an expected status message is not received from said publisher mesh node within a predefined period of time and wherein said transmit equipment is further arranged for:

transmitting an updated probe message to said publisher mesh node, wherein said updated probe message comprises an increased number of hops.

In yet another example, the receive equipment is further arranged for:
  receiving, from a provisioner mesh node said number of hops that was set for said subscriber mesh node during a discovery phase in said mesh network;
  and/or wherein said process equipment is further arranged for
  using said number of hops in a broadcasted message that was last received from said publisher mesh node.

In another example, the process equipment is further arranged for any of:
  determining that a broadcasted message has not been received in case a predefined amount of time has lapsed since a particular broadcasted message that was received;
  determining that an amount of not received broadcasted messages is above a predefined threshold.

In a fourth aspect of the present disclosure, there is provided a publisher mesh node arranged for updating a number of hops that is to be used for communication between said publisher mesh node and a subscriber mesh node in a wireless mesh network, wherein said publisher mesh node comprises:
  transmit equipment arranged for periodically broadcasting messages, wherein said messages comprise a number of hops that said broadcasted message may traverse in said mesh network;
  receive equipment arranged for receiving a probe message from said subscriber mesh node, thereby indicating that one or more periodically broadcasted messages have not been received, wherein said probe message comprises a number of hops corresponding to a periodically broadcasted message that was received by said subscriber mesh node;
  process equipment arranged for updating said number of hops that said broadcasted message may traverse in said mesh network.

In an example, the transmit equipment is further arranged for:
  transmitting, to said subscriber mesh node, a status message wherein said status message comprises an updated number of hops that is to be used for communication between said publisher mesh node and said subscriber mesh node.

In a further example, the process equipment is further arranged for any of:
  maintaining said number of hops used in said broadcasted messages in case said number of hops in said probe message is less then said number of hops used in said broadcasted messages;
  adopting said number of hops in said probe message in case said number of hops in said probe message is more then said number of hops used in said broadcasted messages.

In a fifth aspect, there is provided a computer program product containing computer program code which, when executed by a mesh node, cause the mesh node to implement a method according to any of the examples as provided above.

BRIEF DESCRIPTION OF THE DRAWINGS

FIG. 3 schematically illustrates a method according to the present disclosure.

FIG. 4 schematically illustrates a method according to the present disclosure.

FIG. 5 schematically illustrates a method according to the present disclosure.

DETAILED DESCRIPTION

Figure 1:
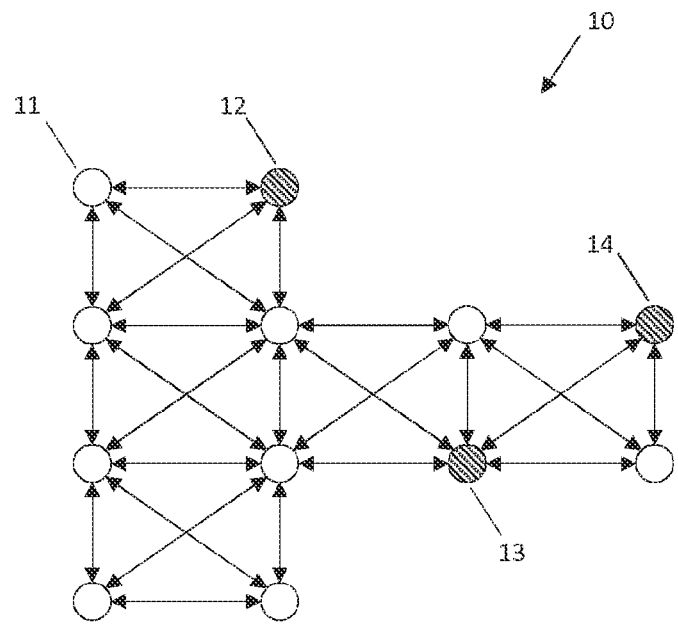
FIG. 1 schematically illustrates a mesh network.

FIG. 1 schematically illustrates a mesh network 10. A publish-subscribe paradigm may be specified for exchanging the application data, i.e., data in Foundation layer or Model layer. The message sender, i.e., message publisher, 11 sends the message to the destination address called a publish address. Meanwhile, one or more receivers, or subscribers 12, 13, 14 subscribe to the publish address to receive the message. When a publisher mesh node 11 sends a multicast message, the number of hops, i.e. the Time To Live. TTL, value of the message is determined based on the distance towards a subscriber mesh node 12, 13, 14 that requires most number of hops. As shown in FIG. 1, publisher mesh node A 11 sends a multicast message to group address GA which is subscribed by subscriber mesh node B 12, subscriber mesh node C 13 and subscriber mesh node D 14. According to the topology, subscriber mesh node B 12 is one hop away from subscriber mesh node A 11. Subscriber mesh node A 11 needs at least two hops to reach subscriber mesh node C 13 and at least three hops to reach subscriber mesh node D 14. As a result, in order to reach all nodes that subscribe to group address GA, publisher mesh node 11 needs to send the mesh message with minimum TTL value equal to three. In practice, the TTL is typically set a little bit higher than the minimum value.

Figure 2:
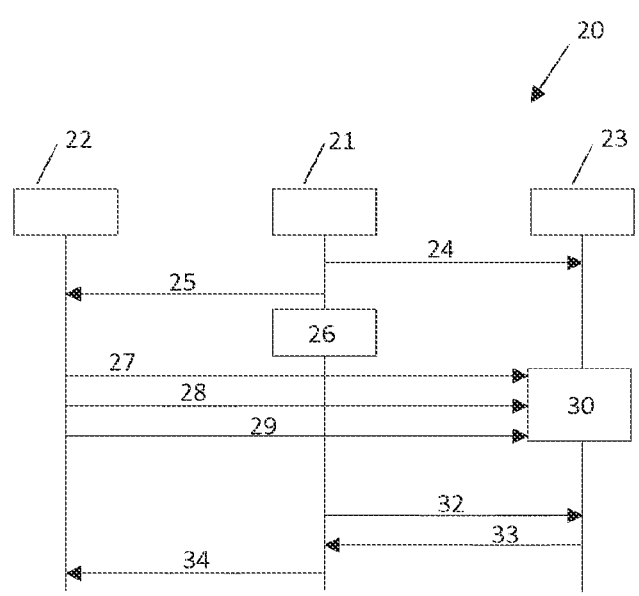
FIG. 2 schematically illustrates an initial configuration procedure of a mesh network according to prior art.

FIG. 2 schematically illustrates a method 20 of determining the TTL according to the prior art. In FIG. 2, node A 22 is the publisher mesh node, and node B 23 is one of the subscribers. The mesh specification defines a heartbeat publish state and a heartbeat subscribe state which are used to control the heartbeat operation and retrieves heartbeat TTL measurement result. These states are defined in a foundation model which could only be accessed by using the device key of each node. In this case, the configuration client 21, which in most of the case a provisioner will do the corresponding configuration of each node. Firstly, the configuration client 21 configures 24 each subscriber 23 to receive the upcoming heartbeat message from the specific publisher 22. Secondly, the configuration client configures 25 the publisher 22 to start sending heartbeat messages. Meanwhile, the configuration client can optionally start a timer 26 to keep track of the heartbeat TTL measurement process time. During this period, the publisher 22 sends heartbeat messages 27, 28, 29 periodically to the preconfigured group address for updating the heartbeat subscription state 30. Once the heartbeat message 27, 28, 29 is received by the subscriber node 23, the measured TTL is recorded in the local node 23. When this procedure is finished, the configuration client 21 contacts 32 each subscriber 23 to collect 33 the test results. By summarizing the received test results 33 the configuration client 21 can configure 34 the publisher 22 to use a reasonable TTL value to publish message to the group address so that all the subscribers have a good chance to receive the message.

Note that the procedure described in FIG. 2 is only for one group address. In case there are multiple publisher—subscribe relationships configured in the mesh network, this procedure is to be repeated for each publisher.

Publisher and Subscriber Internal Storage

During the provisioning, the subscriber mesh node can be informed with the publishers' network address and the message periodicity. Thus, the subscriber knows when to expect the upcoming application message, i.e. a periodic message, from the publisher mesh node. The publisher mesh node can also get the information about the subscriber's network address per group address. In this case, the publisher knows the addresses of the nodes that has subscribed to the group address.

Publisher Internal Memory Structure

An internal data structure, called subscriber TTL list, can be used by the publisher mesh node to store such information. The purpose of this table is to record the TTL of each subscriber mesh node per group address that they subscribe from. An example of this data structure is shown below. The group address field and the element address field stores all the subscribers network address of the corresponding group address. The TTL fields records the number of hops away from the publisher to each subscriber.

| Group Address | Element Address | TTL |
|---|---|---|
| Group Address A | 0x000A | 10 |
| | 0x000B | 7 |
| | 0x000C | 2 |
| Group Address B | 0x000C | 3 |
| | 0x000D | 6 |
| | 0x000E | 15 |

Subscriber Internal Memory Structure

From the subscriber's 102 point of view, the Publisher TTL information table can be used to store the relationship between the publisher 101 and the subscriber 102 and the corresponding TTL. The table below shows one example of the data structure format. The publisher 101 address and the subscriber 102 address fields saves the relationship of the publisher 101 and the group address. The initial TTL is the TTL that used by the publisher 101 to send the application message. The remaining TTL is the network TTL value of the application message when received.

| Publisher address | Subscribe Address | Initial TTL | Remaining TTL |
|---|---|---|---|
| 0x0001 | 0xa00a | 15 | 2 |
| 0x0002 | 0xa00b | 8 | 6 |

TTL Increment

FIG. 3 schematically illustrates a method 100 according to the present disclosure. More specifically, FIG. 3 shows a typical message transaction when a subscriber mesh node 102 recognizes that it is receiving periodic messages from a publisher mesh node 101. The subscriber mesh node 102 recognizes that a publisher mesh node 101 sends periodic application messages, AppMessage, 103, 104 to a group address which it subscribes. The TTL field of the message is set using initial TTL set as nwkTTL_1.

In one embodiment, a parameter can be defined to set the maximum interval for the application message periodicity. If the application message interval is higher than the defined maximum interval, the application is considered as sending messages sporadically. The purpose of this parameter is to keep the minimum sensitivity of the network communication status.

For a subscriber mesh node 102, a timer can be started to keep track of the time when messages are expected from the publisher mesh node. Once a message 103, 104 is received, the timer is reset and keep counting for the next upcoming message.

If an expected message is not received 105 within an estimated time window, the subscriber 102 will send 106 a ttl_probe message 300, i.e. a probe message in accordance with the present disclosure, to the publisher mesh node 101 using unicast address in the destination field.

In an embodiment, the subscriber mesh node 102 can set its own threshold which is used to decide when to send 106 the ttl_probe message 300. For example, a subscriber mesh node 101 can send 106 the ttl_probe message 300 if the first expected message is not received 105. Alternately, the threshold can be set so that the ttl_probe message 300 will only be sent 106 if three application messages 105 are missed consecutively, for example.

In the network layer of the ttl_probe message 300, the SRC field may be set with the network address of the subscriber mesh node, the destination address is set as the network address of the publisher mesh node. The network TTL is set as the same nwkTTL_1 that used by the publisher mesh node 101. The same nwkTTL_1 value is carried in the transport layer PDU as well so, once the message is received by the publisher mesh node 101, it will know the initial TTL value used by the subscriber 102.

In an embodiment, the provisioner can tell the subscriber 102 about the TTL value that was set to the publisher mesh node 101 during the TTL discovery phase as described previously.

In another embodiment, the subscriber mesh node 102 can use the TTL value received from the publisher mesh node 101 when it transmits the heartbeat value. Specifically, the maximum TTL value defined in the foundation model, heartbeat subscription state.

In another embodiment, the subscriber mesh node 102 can use the value saved in its internal memory data structure.

Once the ttl_probe message 300 is sent 106, the subscriber mesh node expects a ttl_status message 350 within certain time. If the ttl_status message 350 is not received on time, the subscriber mesh node may increase 107 the TTL value and send 108 a new ttl_probe message 300. The subscriber mesh node 102 may keep increasing 107 the TTL value of the new sent ttl_probe message 300 until a ttl_status message 350 is received 110.

In one embodiment, it is recommended to have a reasonable TTL increase step 107 when sending a new ttl_probe message, for example, by adding 2 or 3 extra hop every time.

In another embodiment, it is also possible to set an upper limit of number of retries 106 when sending the ttl_probe message 300. If the ttl_status message is not received 110 when the subscriber mesh node reaches the upper transmission limitation, the communication is considered broken for the moment.

From the publisher's 101 perspective, it may receive a ttl_probe message 108 due to two reasons. In the first case, the communication between the subscriber 102 and publisher 101 is not reachable using the current TTL and it needs to be increased. In the second case, the application message 103, 104 sent by the publisher mesh node 101 is lost in the network not because of a shorter TTL value. To identify these two cases, the publisher mesh node 101 needs to compare 109 the initial_TTL value carried in the ttl_probe message and its local TTL value used for message publishing.

If the initial_TTL is smaller than the current TTL, the publisher mesh node 101 may send the ttl_status 110 using the current TTL. Otherwise, the publisher mesh node may use the initial_TTL value contained in the ttl_probe as the TTL value for the out-going ttl_status message. Meanwhile, the network TTL value for the next application message is also increased to the new TTL value, i.e., nwkTTL_2.

Once the subscriber mesh node 102 receives 110 the ttl_status, it may stop sending ttl_probe message 300 and wait for the next incoming application message 111. Once the ttl_status message is sent 110 from the publisher mesh node 101, and the TTL increases, the corresponding TTL field in the publishers 101 internal data structure is also updated. The TTL field of the Subscriber TTL list data structure is updated to the latest TTL per group address that the subscriber 102 listens to and the network address of the subscriber mesh node 102. When the subscriber mesh node 102 receives 110 the ttl_status message, the internal data structure, Publisher TTL information table, is also updated. The entry is first searched by using the publisher address and subscriber address as key. The Initial TTL field is updated according to the initial_TTL value carried from the ttl_status message. The remaining TTL field is assigned with the network TTL value when the message is received.

TTL Decrement

The mesh network topology and communication status might be changed due to redeployment or network extension, e.g., adding new relays. In some cases, the TTL value that was originally configured to the publisher mesh node might become more than necessary. In this case, it is good to reduce the TTL in order to reduce the unnecessary channel occupancy. The TTL decrement procedure comprises of two phases, the discovery phase and the adjusting phase. These two phases are described separately in this section.

TTL Change Discovery Phase

Once the subscriber mesh node 102 receives an application message 151, 152, 153 from the publisher 101, the remaining TTL is typically accessible in the TTL field from the network layer. The remaining TTL indicates how many extra hops that the message may further relayed in the mesh network. From the publisher mesh node 101 point of view, a publisher mesh node 101 may need to set the application message TTL according to the furthest subscriber mesh node.

In order to discover the TTL changes, the subscriber mesh node 102 may need to keep track of either sudden change or the gradually changed TTL value of the received application message. In FIG. 4, i.e. the method as indicated with reference numeral 150, and FIG. 5, i.e. the method as indicated with reference numeral 160, a subscriber mesh node 102 is defined such that it has a TTL value of 3—i.e. an application message sent by the publisher mesh node 101 may need at least three hops to reach the subscriber mesh node 102.

Additionally, a TTL variation threshold, TH, may be defined as being three. The threshold, TH, serves the purpose of increasing the system sensitivity to a changing TLL value. Referring to both FIGS. 4 and 5, it is assumed that due to some changes in the mesh network, the TTL value is being increased by the subscriber mesh node. For example, a first application message 151 sent by the publisher mesh node has a RemainingNwkTTL of 2 when the application message reaches subscriber mesh node 102. The second application message 152 has a RemainingNwkTTL of 4 when the message reaches the subscriber mesh node 152 and the third application message 153 has a RemainingNwkTTL of 9 when the message reaches subscriber mesh node 102.

In one embodiment, a TTL variation threshold can be defined to trigger 161 the sending of a ttl_probe message. The subscriber mesh node may store the previous TTL value that triggers the ttl_probe message. If the TTL value in the received application message, i.e., Remaining TTL−Stored TTL>threshold, the ttl_probe message may be sent from the subscriber mesh node. An example is shown in FIG. 5 the first two AppMessage 151, 152 with RemainingNwkTTL 2 and 4 does not pass the threshold defined by TH (3). However, the third AppMessage 153 triggers 161 the ttl_probe message because RemainingNwkTTL(9)−TTL (3)=6 which is larger than the defined TH (3).

In one embodiment, the ttl_probe message can be sent 161 periodically to urge the publisher mesh node to update the TTL. In another embodiment, the ttl_probe can be sent 161 after every received application message 151, 152, 153 in order to reduce the possible network congestion in a busy mesh network.

TTL Adjusting Phase

The subscriber mesh node 102 may send 161 a ttl_probe message to decrease the TTL of the publisher mesh node. In the network part of the message, the SRC field is set as the network address of the subscriber mesh node. The DST field is set as the network address of the publisher mesh node. The network layer TTL is set as the value that the subscriber mesh node 102 would like to optimize. For example, if the publisher TTL value saved in the subscriber mesh node 102 is 15, a reasonable TTL value for the ttl_probe message 161 could be 7 or 8. The same TTL value is included in the initialTTL field of the transport layer PDU of the sent ttl_probe message 161.

In order to properly decrease the TTL from the publisher mesh node 101 side, the publisher mesh node 101 may need to check the Subscriber TTL list data structure before it responds 162 with the ttl_status message. Once a ttl_probe message is received 161, the publisher mesh node 101 may first need to identify if the message aims at increasing or decreasing the TTL. If the ttl_probe message:

comes from the mesh node that is furthest away from the publisher and

The initialTTL value included in the transport PDU is smaller than the current TTL that the publisher used for sending the application multicast message the publisher will start decreasing the TTL. When setting the TTL value for the outgoing ttl_status message 162, the publisher mesh node 101 may compare if the received initialValue is bigger than the second largest TTL value needed for the subscriber mesh nodes. If so, the initialValue is selected. Otherwise, the second largest TTL saved in the Subscriber TTL list data structure is used for in the ttl_status message.

The ttl_status message 162 is configured as the following. In the network layer, the SRC fields is set as the network address of the publisher mesh node. The DST address is set as the group address for multicast. The network layer TTL is set as the select TTL as shown in this section. The same TTL value is included in the initialTTL field of the transport layer.

In one embodiment, the network TTL field could still be set as the previous TTL that used by the publisher mesh node. The purpose is to increase the possibility for all subscriber mesh nodes 102 to receive the ttl_status message 162. In another embodiment, the publisher mesh node 101 may send the ttl_status message 162 multiple times to increase the chance that all subscriber mesh nodes 102 can receive this message to update the TTL.

When the ttl_status message is received 162 by the subscriber mesh node 102, the subscriber mesh node 102 may stop sending the ttl_probe message. Since the ttl_status is a multi-cast message, all the subscriber mesh nodes that receive the message collect the remaining TTL value from the ttl_status network layer and update the Publisher TTL information table.

Message Sequence Chart for Sporadic Message Publisher

The sporadic message publisher TTL optimization procedure is similar as the case of periodic message publisher mesh node. Only the difference is highlighted here. In one embodiment, the publisher mesh node 101 that is considered as sporadic message publisher mesh node may need to periodically send the ttl_status message to the subscriber's mesh node 102 group address. The ttl_status message interval may be known by all subscriber mesh nodes 102 during the provisioning phase. The subscriber mesh nodes 102 may use the ttl_status message to detect the existence and hop count of the publisher.

In another embodiment, subscriber mesh nodes 102 can be configured to send ttl_probe message periodically. Once the ttl_probe message is received, the publisher mesh node 101 may respond with a ttl_status message. Different intervals can be configured which defines the ttl_probe message publishing speed. If a ttl_status message is received in time, the publisher mesh node 101 can choose to send the ttl_probe message using a relatively longer period. Otherwise, the subscriber mesh node 102 might choose to use a shorter interval to quickly trigger the ttl_status message. The remaining procedure for TTL increase and decrease are the same as described previously.

Publisher Flow Chart

Once a ttl_probe message is received by the publisher mesh node 101, it will search its internal data memory, Subscriber TTL list data structure, using the group address and the element address as the key. If no match found, the received ttl_probe message is discarded. Otherwise, the TTL field of the found entry may be used to compare with the initialTTL value of the ttl_probe message transport layer PDU. If the initialTTL value is bigger than the current TTL value used by the publisher mesh node, the ttl_probe message is considered as a TTL increasing request. Otherwise, if the ttl_probe message comes from the subscriber mesh node that has the largest TTL, and the initialTTL is smaller than the value saved in the table, the ttl_probe is requesting for TTL decreasing. Other cases are considered as neither TTL increase nor TTL decrease, the ttl_status message will be sent using the current TTL value.

Figure 6:
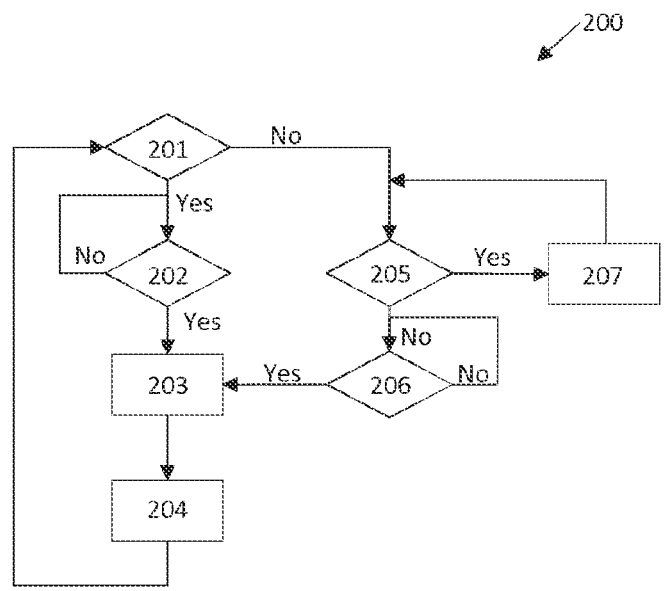
FIG. 6 schematically illustrates a method according to the present disclosure.

As shown by the method 200 in FIG. 6 after provisioning, the publisher mesh node may know by itself if it is a periodic message publisher mesh node or a sporadic message publisher mesh node 201. In case of a sporadic message publisher mesh node, the publisher mesh node 101 may check 205 whether it is time to publish a ttl_status message. If it is time, the publisher mesh node 101 may publish 207 ttl_status message to each group address periodically. Otherwise, the publisher mesh node may wait 206 for incoming ttl_probe message.

Once a ttl_probe message is received, the message purpose is analysed 203 using the Subscriber TTL list data structure. The ttl_status message is prepared according to the received ttl_probe message and the message is eventually sent 204 to the group address.

If however, the publisher mesh node 101 is a periodic message publisher, it checks 202 if a ttl_probe message has been received. Upon receiving a ttl_probe message, the publisher mesh node 201 may detect 203 the purpose of the received ttl_probe message—i.e. to increase or decrease the TTL. A ttl_status message is prepared according to the received ttl_probe message and the message is eventually sent 204 to the group address.

Subscriber Flow Chart

The internal data structure, Publisher TTL information table, is used to save the relationship of publisher mesh node and multicast address relationship, the TTL value that the publisher mesh node used to send the application message and the remaining TTL when the application message is received. The network layer TTL value of the received ttl_status is compared with the remaining TTL value of the table to decide if a ttl_probe message should be sent to the publisher mesh node to decrease the TTL. Once a ttl_status message is received by a subscriber mesh node, the initial TTL field is updated according to the initial_TTL value in the transport PDU part. The remaining TTL field is updated according to the network TTL field of the received ttl_status message. Once the subscriber mesh node decides to send a ttl_probe message, the network TTL value is set according to the value saved in the initial TTL field.

Figure 7:
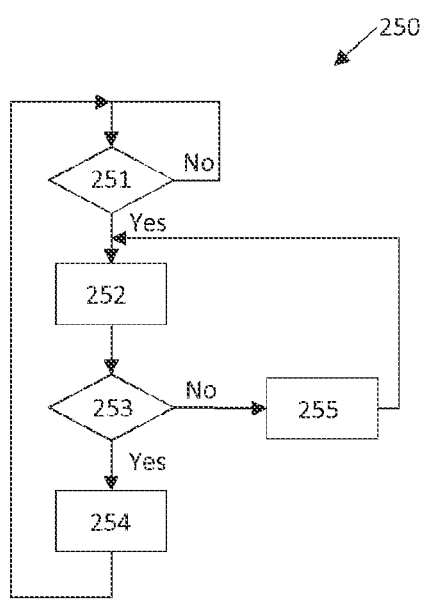
FIG. 7 schematically illustrates a method according to the present disclosure.

Referring now to the method 250 shown in FIG. 7, The subscriber 102 decides 251 if a ttl_probe message should be sent to the publisher mesh node 101 either for TTL increase or decrease purpose. If a ttl_probe message needs to be sent, the subscriber mesh node 102 sends 252 the message and expects a corresponding ttl_status message in response. If 25 the message is received, the local storage is updated 254 as described above. Otherwise, the TTL value of the ttl_probe message is increased 255 and sent 252 to the publisher mesh node 101 again. Once the ttl_status message is received, the subscriber mesh node may stop sending the ttl_probe message.

Model State Definition

This section shows a possible implementation of the idea described in this disclosure. The disclosure may be defined in terms of states which is compatible with the standard BLE mesh specification. Two states are defined to control the TTL update procedure, i.e., the TTL PROBE state and the TTL STATUS state. The TTL_PROBE states define the subscriber operation on sending the ttl_probe message while the TTL_STATUS state defines the operation that the publisher mesh node sends the ttl_status message. The behaviors upon state value change is also described in this section.

TTL_PROBE State

This state may be implemented in all application message subscribers. This state is a composite state and may contain the following sub-states.

TTL increase step. The number of TTL increased if the previous send ttl_probe message is not respond with ttl_status.

TTL variation threshold. The threshold of TTL variation when a ttl_probe message is sent for TTL decrease.

Max publisher silence time. The maximum time without publish communication before the subscriber send a ttl_probe message.

Number of TTL probe message. The upper limit of number of ttl_probe message that the subscriber send for TTL adjustment.

TTL status waiting time. The waiting time after a ttl_probe message sent to the publisher until the next ttl_probe message being sent.

TTL_STATUS State

This state is implemented in the publisher side to control the behaviour of the ttl_status sending if the publisher is a sporadic application message publisher.

Is periodic publisher. A Boolean Indicator to flag if the publisher is a periodical message publisher or not.

TTL status message periodicity. For sporadic publishers only. Set to configure the ttl_status message periodicity.

The Model

A model may be defined to contain the instances of TTL_PROBE state, TTL_STATUS state, ttl_probe message and ttl_status message. The model may also specify the functions to operate the procedures of optimizing the TTL value by using the defined states and messages. In one embodiment, the model is a Bluetooth SIG adopted model that extends an existing model such as the Heartbeat model. In another embodiment, the model is a Bluetooth SIG adopted model that is a root model which does not extend any other models. In yet another embodiment, the model is a vendor model that extends an existing model such as the Heartbeat model. In yet another embodiment, the model is a vendor model that is a root model which does not extend any other models.

Memory Consumption Consideration

One potential problem of the present disclosure is that it might require extra memory to handle the replay protection. The replay protection mechanism is one of the security procedures that is applied by the Bluetooth Low Energy, BLE, mesh to protect the network from replay attack. It requires a destination node to remember the signature of the last message that was sent to it from all the source nodes. For example, a destination node can use the network source address (2 bytes) and the network sequence number (3 bytes) of the source node as the signature. In this case, to keep track each source node, it requires 5 bytes for replay attack protection. Since the proposal according to the present disclosure potentially might require all the message subscribers to send ttl_probe message to the message publisher, it implies that the replay protection memory consumption of the publisher is dependent on the number of its subscribers. However, the replay protection buffer servers a general purpose of message transmission, and the proposal according to the present disclosure will only consume extra memory for replay protection if the relationships between the publisher and the subscriber(s) fulfil all the following conditions.

The message subscriber does not send any other message to the message publisher except the ttl_probe in the network.

The message publisher only sends unreliable message to the subscriber, which means the publisher in the network does not expect any acknowledgement from the subscriber(s).

To solve this potential problem, the inventors propose two possible solutions.

Since the publish—subscribe relationship is known by the provisioner, the memory requirement for replay protection can be informed to the publisher during the configuration period. If the publisher cannot fulfil the requirement, it can inform the provisioner during this phase. In this case, it is possible for the provisioner and network administrator to aware of this potential problem.

Alternatively, the publisher can decide to stop using this feature if this feature requires too much memory that a publisher can afford. Each publisher keeps track on the replay protection memory entities that is dedicated for ttl_probe message. This can be done by identifying the message from its opcode. If the memory requirement for keeping track of ttl_probe excesses the publisher memory capacity, the publisher can delete all the entries that is dedicated for ttl_probe message. The saved space can be used for replay protection for other nodes. Alternately, it may also send a multicast message to the group, probably multiple times, indicating the publisher will stop processing any incoming ttl_probe message. In an embodiment, this message can include a value to indicate the time when the publisher will start processing the ttl_probe again.

During this period, if a ttl_probe message is received, it will be discarded silently and will not be put into the replay protection buffer.

From this time, the publisher starts using a relatively big TTL value for the following message transmission.

Optionally, a warning message may be sent from the publisher to the network administrator to indicate this problem.

ttl_probe Message Format

Figure 8:
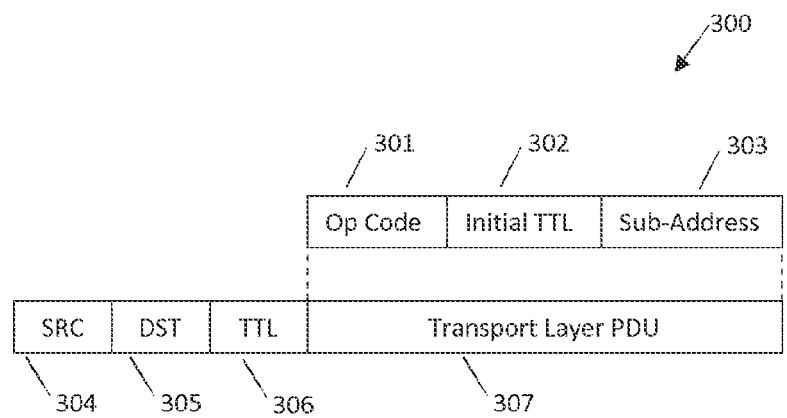
FIG. 8 schematically illustrates the format of a message according to the present disclosure.

FIG. 8 illustrates a possible message format of a ttl_probe message according to the present disclosure. The ttl_probe message 300 is sent from application message subscribers to one or more application message publishers. It is a unicast message with source address, SRC, 304 field in the network layer set as the subscriber's network address and the destination address, DST, 305 field in the network layer as the publisher network address. The ttl_probe message 300 is a message sent by the application message subscriber to the application message publisher asking for TTL update. The message format of the ttl_probe message is shown in FIG. 8. In the network layer, the SRC field 304 is set as the network address of the subscriber element. The DST field 305 is set as the network address of the application message publisher. The value of TTL 306 is set by the application.

In one embodiment, the ttl_probe message 300 is defined as one of Transport Control messages which are generated by upper transport layer and only encrypted/authenticated at the network layer.

In another embodiment, the ttl_probe message 300 is defined as an access message which are generated by a model and encrypted/authenticated at the upper transport layer and the network layer.

In either of the above embodiments, the ttl_probe message contains opcode 301 and parameters 302, 303. The opcode 301 that identifies the message can be defined as a Bluetooth SIG opcode or a vendor opcode. The parameters consist of a "Initial TTL" field 302 and "Sub-Address" field 303. The initial TTL field 302 is set with the TTL value used by the message publisher when sending this message. The Sub-address field 303 is set with the group address that the node is subscribed with.

ttl_status Message Format

Figure 9:
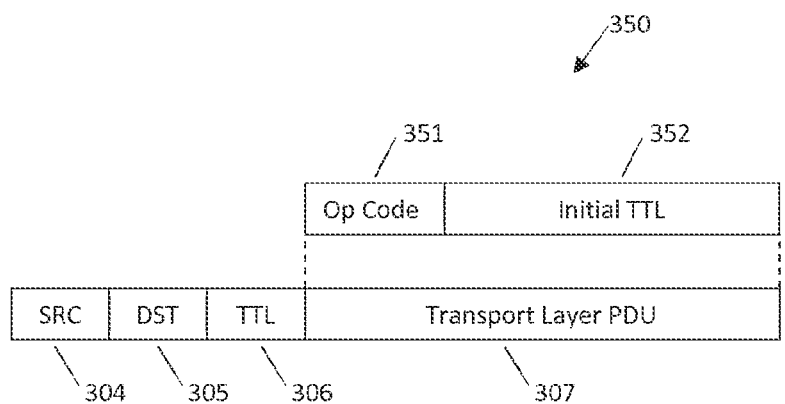
FIG. 9 schematically illustrates the format of a message according to the present disclosure.

FIG. 9 illustrates a possible message format of a ttl_probe message according to the present disclosure. The ttl_status message 350 is sent from the application message publisher to the application message subscribers. It is a multicast message with source address 304 set as the publisher network address and the destination address 305 as the group address that subscribed by the subscribers. The ttl_status message 350 is sent from the message publisher once it receives a ttl_probe message 300. The message format of the ttl_status message 350 is shown in FIG. 9. In the network layer, the SRC field 304 is set as the network address of the ttl_status message 350 sender, i.e., the application message publisher. The DST field 305 is set as a group address that subscribed by the application message subscribers. The value of TTL 306 is set by the application.

In one embodiment, the ttl_status message 350 is defined as one of Transport Control messages which are generated by upper transport layer and only encrypted/authenticated at the network layer.

In another embodiment, the ttl_status message is defined as an access message which are generated by a model and encrypted/authenticated at the upper transport layer and the network layer.

In either of the above embodiments, the ttl_status message 350 contains opcode 351 and parameters 352. The opcode 351 identifies that the message can be defined as a Bluetooth SIG opcode or a vendor opcode. The parameters consist of a "Initial TTL" field 352. The initial TTL field 352 is set as the TTL value that is set by the ttl_status message 350 sender.

It is possible to define the ttl_probe message 300 and ttl_status message 350 as either transport control message or access layer message. In either case, the message should contain the fields defined above.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article, "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of updating a number of hops that is to be used for communication between a publisher mesh node and a subscriber mesh node in a wireless mesh network, wherein said method comprises the steps of:
    the publisher mesh node broadcasting messages in the wireless mesh network, wherein each of said broadcasted messages comprises a number of hops that said broadcasted message may traverse in said mesh network, and wherein the messages include a first message and a second message that is broadcast after the first message, wherein the first message has a first number of hops that the first message may traverse in the mesh network, and the second message has a second number of hops that the second message may traverse in the mesh network;
    in response to the publisher mesh node receiving a probe message, the publisher mesh node broadcasting a third message, wherein the probe message is a request for the publisher mesh node to update the number of hops that a next broadcasted message may traverse in the mesh network and wherein the probe message comprises information that indicates the first number of hops, and wherein the third message comprises a third number of hops that is higher than the second number of hops.

2. The method of claim 1, wherein the first number of hops is higher than the second number of hops.

3. The method of claim 1, wherein the number of hops of the third message is equal to the first number of hops.

4. The method of claim 1, wherein the publisher mesh node periodically broadcasts the messages in the wireless mesh network at a known rate.

5. The method of claim 4, wherein:
    the known rate has a known period;
    the publisher mesh node receives the probe message after an amount of time following a broadcasting of the second message, wherein the amount of time is greater than or equal to the known period.

6. A publisher mesh node configured for updating a number of hops that is to be used for communication between said publisher mesh node and a subscriber mesh node in a wireless mesh network, wherein said publisher mesh node comprises:
    transmit equipment configured to broadcast messages in the wireless mesh network, wherein each of said broadcasted messages comprises a number of hops that said broadcasted message may traverse in said mesh network, and wherein the messages include a first message and a second message that is broadcast after the first message, wherein the first message has a first number of hops that the first message may traverse in the mesh network, and the second message has a second number of hops that the second message may traverse in the mesh network;
    equipment configured to cause the transmit equipment to broadcast a third message in response to the publisher mesh node receiving a probe message, wherein the probe message is a request for the publisher mesh node to update the number of hops that a next broadcasted message may traverse in the mesh network and wherein the probe message comprises information that indicates the first number of hops, and wherein the third message comprises a third number of hops that is higher than the second number of hops.

7. The publisher mesh node of claim 6, wherein the first number of hops is higher than the second number of hops.

8. The publisher mesh node of claim 6, wherein the number of hops of the third message is equal to the first number of hops.

9. The publisher mesh node of claim 6, wherein the publisher mesh node periodically broadcasts the messages in the wireless mesh network at a known rate.

10. The publisher mesh node of claim 6, wherein:
    the known rate has a known period;
    the publisher mesh node receives the probe message after an amount of time following a broadcasting of the second message, wherein the amount of time is greater than or equal to the known period.

* * * * *